United States Patent
Yokota et al.

(12)

(10) Patent No.: US 6,391,402 B1
(45) Date of Patent: May 21, 2002

(54) EASILY RECYCLABLE CONTAINER

(75) Inventors: Kenzi Yokota, Chiba; Akio Uemura, Osaka; Takahiro Ishii, Osaka; Masato Takaku, Osaka; Masaru Sato, Osaka, all of (JP)

(73) Assignees: Japan Polystyrene, Inc.; Yokota Co., Ltd., both of (JP)

( * ) Notice: Subject to any disclaimer, the term of this patent is extended or adjusted under 35 U.S.C. 154(b) by 0 days.

(21) Appl. No.: 09/357,159

(22) Filed: Jul. 19, 1999

(30) Foreign Application Priority Data

| Jul. 24, 1998 | (JP) | ............................................. 10-209788 |
| Dec. 1, 1998 | (JP) | ............................................. 10-341611 |
| Jul. 9, 1999 | (JP) | ............................................. 11-196013 |

(51) Int. Cl.[7] ............................................. B32B 1/08
(52) U.S. Cl. .................. 428/34.1; 428/35.7; 428/317.1; 428/318.6; 428/319.7; 428/40.1
(58) Field of Search ............................. 428/34.1, 40.1, 428/317.1, 318.6, 319.7, 319.9, 35.7, 35.9; 220/406, 495.1

(56) References Cited

U.S. PATENT DOCUMENTS

| 4,944,427 A | * | 7/1990 | Yamada et al. ............. 220/406 |
| 5,281,453 A | * | 1/1994 | Yamada et al. ............. 428/35.7 |
| 5,882,782 A | * | 3/1999 | Tsubone ................... 428/317.1 |

FOREIGN PATENT DOCUMENTS

| DE | 4031809 A1 | 4/1992 |
| DE | 40 31 809 A | 4/1992 |
| EP | 0437856 A2 | 7/1991 |
| EP | 0 437 856 A | 7/1991 |
| EP | 0659116 B1 | 6/1995 |
| JP | 4-38942 | 4/1992 |
| JP | 4-111429 | 9/1992 |
| JP | 4111429 U | 9/1992 |

OTHER PUBLICATIONS

*Polymer Blend* by Saburo Akiyama et al., pp. 125–144 (1991).

"Some Factors Affecting the Solubility of Polymers", by P.A. Small, *Journal of Applied Chemistry*, vol. 3, pp. 71–80 (Feb. 1953).

\* cited by examiner

*Primary Examiner*—Harold Pyon
*Assistant Examiner*—Sow-Fun Hon
(74) *Attorney, Agent, or Firm*—Burns, Doane, Swecker & Mathis, L.L.P.

(57) ABSTRACT

An easily recyclable container obtained by subjecting a sheet L which is a laminate of a plurality of layers, to vacuum forming and/or pressure forming, in which container the sheet L has such two adjacent layers as to give the minimum peeling strength and can be manually separated into two portions at the interface of the two adjacent layers, and when the portion of the sheet L present from the interface of said two adjacent layers to the inner surface of the container is named as film portion F and the portion of the sheet L present from said interface to the outer surface of the container is named as sheet portion S, the peeling strength required for peeling of the film portion F from the sheet portion S is set at 2 to 45 g/15 mm (width) by allowing said two adjacent layers giving the minimum peeling strength to be constituted by respective particular resins or resin compositions.

This container has easy recyclability because, after the use, (1) the thin film constituting the inside surface of the container can be easily peeled by manual pulling of the tongue-shaped part of the film, (2) the left-overs in the container can be discarded by being wrapped by the film, (3) there is no need of washing the container, and (4) the main portion of the container can be easily recovered.

15 Claims, 1 Drawing Sheet

EASILY RECYCLABLE CONTAINER

BACKGROUND OF THE INVENTION (1) Field of the Invention

The present invention relates to a plastic container used for packaging of foods, etc., which is easily recyclable after use. More particularly, the present invention relates to a recyclable plastic container which, after the use by consumers, can be recovered in a state not stained with any contents even if no washing of container is made.

(2) Description of the Prior Art

In recent years., use of food-packaging containers made of a plastic has rapidly spread for various reasons such as (1) the containers can be produced on a large scale, (2) they can be formed in any desired shape, (3) they enable automatic filling and packaging, (4) they are lightweight and easy to handle, (5) they are resistant to breakage, (6) they are easy to color or apply printing thereon, (7) they can be produced at a low cost, and (8) they can be produced from a material (s) appropriately selected from various plastics so as to meet the applications. For example, in packaging of foods such as lunch box, side dishes to be taken with rice, and the like, polystyrene containers are in wide use because of excellent productivity. It is often conducted to heat lunch boxes, etc. in a microwave oven and, in such a case, heat resistance is required for the containers; therefore, food-packaging containers made of polypropylene or the like are used for such purposes.

Meanwhile, with the spread of. plastic containers, the public hazard caused by discarded plastic containers and the effective utilization of resources have come to be taken up as an important problem or task. Hence, there has arisen a movement that producers of plastic containers recover plastic containers after use. The recovery ratio, however, is relatively low yet. While the plastic containers to be recycled need be washed, consumers are very reluctant to wash used containers stained with foods and, moreover, washing of stained plastic containers after recovery requires a very large expense. For these reasons, the recovery ratio of used plastic containers has been low and the recycling of plastic containers has made no substantial progress.

Under such a situation, there is proposed in, for example, Japanese Utility Model Laid-Open No. 4-38942 (1992 of a container by peeling of a film present at the inside of the container after the use of the container. However, there has been no good proposal as to the recovery and recycling of a container formed by laminating different kinds of films. Meanwhile, in Japanese Utility Model No. 7-56190 (1985) is disclosed a technique of, in a container comprising (1) a base layer (made of a foamed synthetic resin) and (2) a surface layer (e.g. a synthetic resin film), peeling the surface layer from the base layer to recover the base layer. In this technique, however, the peeling strength between the base layer and the surface layer is 50 to 500 g/15 mm (width), and this strength is too large for manual peeling.

SUMMARY OF THE INVENTION

The present inventions aims at providing a plastic container which, after the use, can be easily recovered in a state not stained with any contents even if no washing of container is made.

In order to provide such a plastic container, the present inventors made a study on a technique wherein (1) the inner surface film of a plastic container can be manually peeled, after the use of container, more easily than in containers of past proposals, (2) the contents left over in the container can be completely removed by the above peeling, and (3) the container can be recovered in a clean state not stained with any contents. (This technique enables the reuse of recovered container and the use of peeled film as a fuel.) As a result, the present inventors found out such a resin composition used in container and such a container structure as to give an appropriate adhesion strength and resultantly be able to provide a plastic container wherein the surface film is not peeled from the main portion of container during production or use of container but, after the use of container, can be peeled more easily than in conventional plastic containers. The present invention has been completed based on the above finding. The present invention is as follows.

1. An easily recyclable container obtained by subjecting a sheet L which is a laminate of a plurality of layers, to vacuum forming and/or pressure forming, in which container the sheet L has such two adjacent layers as to give the minimum peeling strength and can be manually separated into two portions at the interface of the two adjacent layers, when the portion of the sheet L present from the interface of said two adjacent layers to the inner surface of the container is named as film portion F and the portion of the sheet L present from said interface to the outer surface of the container is named as sheet portion S, the film portion F is a single-layered film or a multi-layered film comprising two or more layers and the sheet portion S is a single-layered sheet or a multi-layered sheet comprising two or more layers, when one of said adjacent layers giving the minimum peeling strength, belonging to the film portion F is named as layer FS and the other layer belonging to the sheet portion S is named as layer SF, either of the layer FS and the layer SF comprises a resin composition containing the following component (A) in an amount of 50 to 99% by weight and the following component (B) in an amount of 1 to 50% by weight (this layer is named as layer P) and the other layer comprises, as a resin, the component (A) other than used in the layer P and comprises no component (B) (this layer is named as layer Q), thereby, the peeling strength required for peeling of the film portion F from the sheet portion S is set at 2 to 45 g/15 mm (width).

(A) One kind of resin selected from polystyrene, polypropylene and polyethylene.

(B) At least one kind of polymer other than the component (A), having a solubility parameter (SP) of 8.40 to 8.70.

2. A container according to the above 1, wherein the collar has a part making easier the peeling of the film portion F.

3. A container according to the above 2, wherein the collar part making easier the peeling of the film portion F is a tongue or a notched part formed in the collar so that the notched part can be bent and pulled manually.

4. A container according to any of the above 1 to 3, wherein the proportions of the component (A) and the component (B) in the resin composition containing these two components are 75 to 99% by weight [the component (A)] and 1 to 25% by weight (the component (B)).

5. A container according to any of the above 1 to 4, wherein the resin constituting the layer Q is a polyethylene and the component (A) in the layer P is a polystyrene.

6. A container according to any of the above 1 to 4, wherein the resin constituting the layer Q is a polypropylene and the component (A) in the layer P is a polyethylene or a polystyrene.

7. A container according to any of the above 1 to 4, wherein the resin constituting the layer Q is a polystyrene and the component (A) in the layer P is a polypropylene or a polyethylene.
8. A container according to any of the above 1 to 4, wherein the resin constituting the layer Q is a decomposable polyethylene and the component (A) in the layer P is a polystyrene.
9. A container according to any of the above 1 to 8, wherein the component (B) is at least one kind of copolymer selected from copolymers of ethylene and at least one vinyl monomer selected from unsaturated carboxylic acids, unsaturated carboxylic acid esters and vinyl acetate, and styrene copolymers.
10. A container according to the above 9, wherein the component (B) is at least one kind of copolymer selected from ethylene-methyl methacrylate copolymer, ethylene-vinyl acetate copolymer, ethylene-methyl acrylate copolymer and styrene-butadiene copolymer.
11. A container according to any of the above 1 to 10, wherein, when the sheet portion S is a multi-layered sheet, at least one layer of the sheet portion S other than the layer SF contacting with the film portion F is made of a foamed synthetic resin.
12. A container according to any of the above 1 to 11, wherein, when the sheet portion S is a multi-layered sheet, at least one layer of the sheet portion S other than the layer SF contacting with the film portion F contains at least one kind of recycled resin selected from polystyrene, polyethylene, polypropylene, and polymers having a solubility parameter (SP) of 8.40 to 8.70.
13. A container according to any of the above 1 to 12, wherein the peeling strength needed for peeling of the film portion F from the sheet portion S is 2 to 25 g/15 mm (width).
14. A container according to any of the above 1 to 13, wherein the sheet portion S and the film portion F have been laminated by melt-extruding a sheet portion S onto a running film portion F.
15. A container according to any of the above 1 to 14; which is used for foods.

DETAILED DESCRIPTION OF THE INVENTION

The present invention is hereinafter described in detail.

Figure 1:
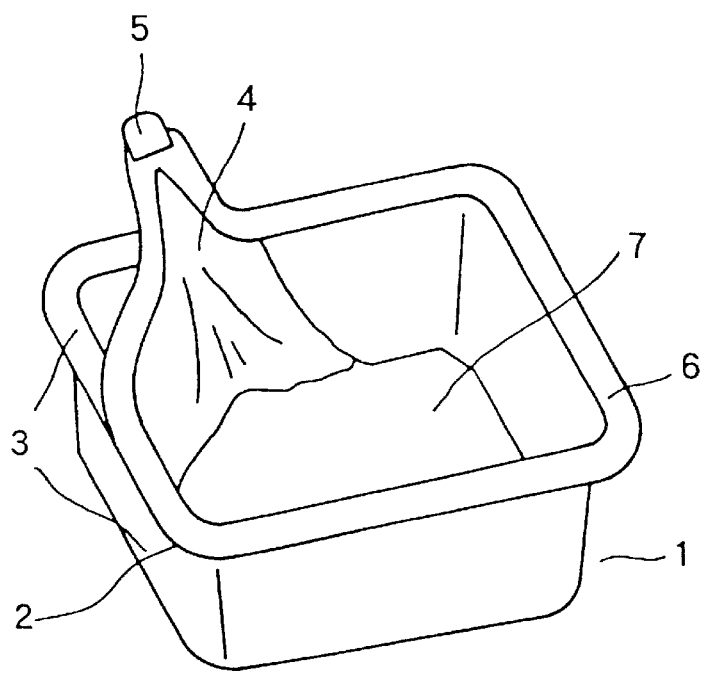
FIG. 1 is a perspective view of a container as an embodiment of the present invention.
Figure 2:
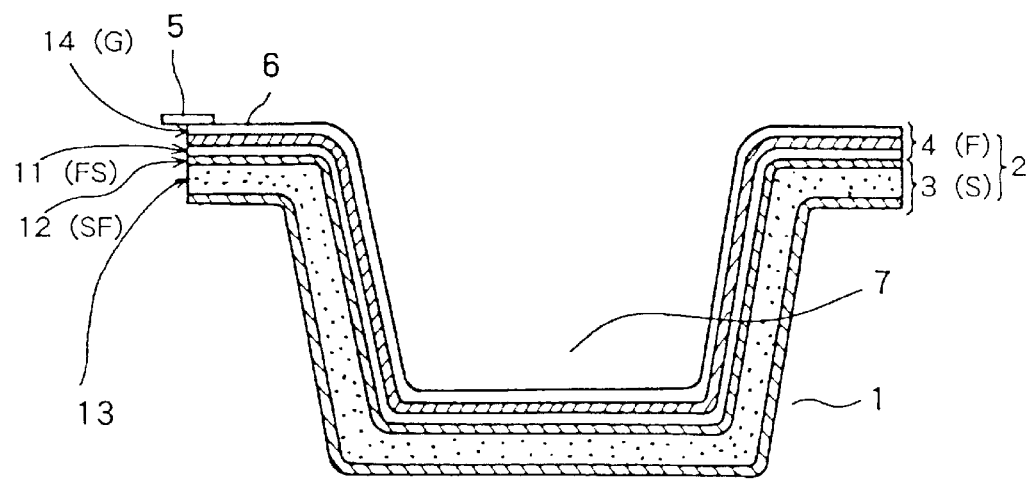
FIG. 2 is a sectional view of the container of FIG. 1.

For easy understanding of the easily recyclable container of the present invention, description is made first with reference to FIG. 1 and FIG. 2.

FIG. 1 is a perspective view of a container as an embodiment of the present invention, and shows a container 1 comprising a collar 6, an accommodating section 7 and a tongue 5, obtained by subjecting a sheet L represented by numeral 2 (which is a laminate of a sheet portion S represented by numeral 3 and a film portion F represented by numeral 4) to vacuum forming and/or pressure forming.

FIG. 2 is a sectional view of the container of FIG. 1 and shows that the sheet L represented by numeral 2 consists of a sheet portion S represented by numeral 3 and a film portion F represented by numeral 4. FIG. 2 also shows that 11 (the surface layer FS) of 4 (the film portion F) is in contact with 12 (the surface layer SF) of 3 (the sheet portion S) is constituted by 12 (the surface layer SF), 13 (an intermediate layer) and other surface layer.

Further, it is shown that the film portion F represented by numeral 4 consists of the surface layer FS layer 11 which is the film portion F in contact with the sheet portion S, the intermediate layer, and the surface layer G layer 14 which is the surface layer of opposite side of the FS layer 11.

The sheet L (which is a laminate of a plurality of layers) used in the present invention can be viewed as separable into two portions, i.e. a film portion F and a sheet portion S at an interface of such two adjacent layers as to give the minimum peeling strength between them. The peeling strength required for peeling of the film portion F from the sheet portion S is 2 to 45 g/15 mm (width), preferably 2 to 25 g/15 mm (width), more preferably 2 to 15 g/15 mm (width). A peeling strength smaller than 2 g/15 mm (width) is not preferred because the film portion F may be peeled from the sheet portion S during production or use of container. A peeling strength larger than 45 g/15 mm (width) is not preferred, either, because manual peeling of the film portion F from the sheet portion S after use of container is difficult.

Herein, the peeling strength is a peeling strength when a rectangular laminate sheet of 15 mm in width is subjected to a 180° peeling test at a peeling speed of 200 mm/min.

In the present invention, when, of the two adjacent layers giving the minimum peeling strength, one layer belonging to the film portion F is named as layer FS and the other layer belonging to the sheet portion S is named as layer SF, either one of the layer FS and the layer SF contains the component (A) in an amount of 50 to 99% by weight and the component (B) in an amount of 1 to 50% by weight (this layer is named as layer P); and the other layer contains, as a resin, the component (A) other than used in the layer P and contains no component (B) (this layer is named as layer Q). Therefore, when the layer FS is the layer P, the layer SF is the layer Q; and when the layer FS is the layer Q, the layer SF is the layer P.

The component (A) used in the present invention is a resin selected from a polystyrene resin, a polypropylene resin and a polyethylene resin.

As the polystyrene resin, there can be used a general-purpose polystyrene resin, a rubber-modified polystyrene resin and a mixture thereof. Of these, a rubber-modified polystyrene resin preferred in view of the impact strength.

Herein, the general-purpose polystyrene resin is a resin also called as GPPS and is ordinarily a styrene homopolymer. The rubber-modified polystyrene resin is obtained by polymerizing a styrene type monomer in the presence of a rubber-like polymer and is also called as HIPS (high-impact polystyrene). The molecular structure of the polystyrene resin may be linear chain type or a branched chain type. The branched chain type can be obtained by copolymerization with a polyfunctional vinyl monomer (e.g. divinylbenzene) or by use of a polyfunctional initiator, a polyfunctional chain transfer agent or the like.

The styrene type monomer used in production of the general-purpose polystyrene resin or the rubber-modified polystyrene resin-is generally styrene. There can also be used alkyl-substituted styrenes such as α-methylstyrene, o-methylstyrene, m-methylstyrene, p-methylstyrene and the like.

As the polypropylene resin, there can be used a propylene homopolymer and propylene copolymers such as. block polypropylene, random polypropylene and the like.

As the polyethylene resin, there can be used a high-density polyethylene, a high-pressure-produced low-density polyethylene, and a linear low-density polyethylene which is a copolymer between ethylene and an α-olefin of 4 to 12 carbon atoms.

The component (B) used in the present invention has a solubility parameter (SP) of 8.40 to 8.70, preferably 8.40 to 8.65. A SP smaller than 8.40 or larger than 8.70 is not preferred because no adhesion is obtained between the sheet portion S and the film portion F or the adhesion between the two portions is too strong.

Herein, the solubility parameter is an intermolecular attraction defined based on the Hildebrand-Scatchard theory, and its detail is described in ordinary text books of polymer science, for example, polymer Blend Saburo Akiyama and others, CMC, fourth printing, pp. 125 to 144 (1991). The solubility parameter can be measured, for example, by an experimental method such as viscosity method, swelling index method or the like, or by a calculation method using a molecular structure, and its value varies depending upon the measurement method used. Hence, the calculation method using a molecular structure, proposed by Small was used herein. The method and the theory thereof are described in detail in Journal of Applied Chemistry, Vol. 3, pp. 71 to 80 (1953). Using the method, the solubility parameter was calculated using the following formula.

$$SP = \Sigma Fi/V = \rho \cdot \Sigma Fi/M$$

In the above formula, Fi is a molar attraction by the atom, atomic group, bond and the like constituting a molecule; V is a molar volume; $\rho$ is a density; M is a molecular weight and, when the component (B) is a polymer, a molecular weight of each monomer unit. As the value of Fi, there was used a value of Small described in the above literature. The $\rho$, $\Sigma Fi$ or M of a copolymer was calculated as follows, believing that additive property holds for them. That is, the value of the $\rho$, $\Sigma Fi$ or M of each monomer constituting the copolymer was multiplied by its molar fraction and each resultant product was summed up.

As the polymer of the component (B) having a SP of 8.40 to 8.70, used in the present invention, there can be mentioned copolymers between ethylene and at least one vinyl monomer selected from unsaturated carboxylic acids, unsaturated carboxylic acid esters and vinyl acetate; styrene copolymers; and so forth. Examples thereof include an ethylene-unsaturated carboxylic acid copolymer, an ethylene-unsaturated carboxylic acid ester copolymer, an ethylene-vinyl acetate copolymer, an ethylene-unsaturated carboxylic acid ester-vinyl acetate terpolymer, a multicomponent polymer composed of ethylene and two or more kinds of unsaturated carboxylic acid esters, a styrene-butadiene copolymer, a styrene-isoprene copolymer, a hydrogenation product of a styrene-butadiene copolymer, and a hydrogenation product of a styrene-isoprene copolymer.

Specific examples of the unsaturated carboxylic acids include acrylic acid and methacrylic acid. Specific examples of the unsaturated carboxylic acid esters include ethyl acrylate, methyl acrylate, 2-ethylhexyl acrylate, stearyl acrylate, glycidyl acrylate, methyl methacrylate, ethyl methacrylate, 2-ethylhexyl methacrylate, stearyl methacrylate and glycidyl methacrylate.

Preferred examples of the copolymers between ethylene and at least one vinyl monomer selected from unsaturated carboxylic acids, unsaturated carboxylic acid esters and vinyl acetate are an ethylene-acrylic acid copolymer, an ethylene-methacrylic acid copolymer, an ethylene-methyl methacrylate copolymer, an ethylene-ethyl methacrylate copolymer, an ethylene-ethyl acrylate copolymer, an ethylene-methyl acrylate copolymer, an ethylene-vinyl acetate copolymer, an ethylene-methyl acrylate-glycidyl methacrylate-copolymer, an ethylene-methyl methacrylate-glycidyl methacrylate copolymer, and an ethylene-vinyl acetate-glycidyl methacrylate copolymer.

In the above copolymers, the proportions of the vinyl monomer and ethylene can be appropriately determined so as to give a copolymer having a SP of 8.40 to 8.70, preferably 8.40 to 8.65. The proportion of vinyl monomer in copolymer is preferably 5 to 60% by weight, more preferably 10 to 50% by weight. As to the mode of bonding (e.g. random, block or alternate) between vinyl monomer and ethylene in copolymer, there is no restriction. As to the melt flow rate of copolymer (as measured at 190° C. under a load of 2.16 kgf according to JIS K 7210), there is no restriction, either; however, the melt flow rate is preferably about 1 to 500 g/10 min.

Specific examples of the styrene copolymers are a styrene-butadiene copolymer, a styrene-isoprene copolymer, a hydrogenation product of a styrene-butadiene copolymer, and a hydrogenation product of a styrene-isoprene copolymer.

As the styrene monomer, there can be used, besides styrene, alkyl-substituted styrenes such as α-methylstyrene, o-methylstyrene, m-methylstyrene, p-methylstyrene and the like; and mixtures thereof.

The proportions of styrene monomer and other comonomer in styrene copolymer can be appropriately determined so as to give a copolymer having a SP of 8.40 to 8.70. The proportion of other comonomer in copolymer is preferably 20 to 80% by weight, more preferably 35 to 70% by weight. As to the mode of bonding (e.g. random, block or alternate) between styrene monomer and other comonomer in copolymer, there is no restriction.

In the present invention, the component (B), i.e. the polymer having a SP of 8.40 to 8.70 does not include the above-mentioned component (A).

When the layer FS is a layer Q, the specific resin used in the layer FS includes, for example, linear low-density polyethylenes (which are a copolymer between ethylene and an a-olefin having 4 to 12 carbon atoms), such as ethylene-butene-1 copolymer, ethylene-hexene-1 copolymer, ethylene-octene-1 copolymer, ethylene-4-methylpentene-1 copolymer and the like, a high-density polyethylene, a high-pressure-produced low-density polyethylene, a polypropylene resin, a polystyrene, a degradable polyethylene (including a biodegradable polyethylene), a polyester, a polyamide, a polycarbonate, a cellulose, a polyvinyl chloride, a polyvinylidene chloride, fluorocarbon polymers, a polyvinyl alcohol, an aromatic polyamide, and a polyimide; however, excludes the component (B) resin and the component (A) resin used in the layer SF (i.e. layer P).

When the layer FS is a layer Q and the resin used in the layer FS is a polypropylene resin, the layer FS is, for example, a casted polypropylene (CPP) film. Also, the film portion F is, for example, a polypropylene/polyethylene/polypropylene three-layered film.

When the layer G of the film portion F (which is a surface layer of the film portion F, not contacting with the sheet portion S) is a polypropylene film, the layer G has excellent resistance to oily foods when the container of the present invention is, for example, a food container.

When the layer SF is a layer Q, the specific resin used in the layer SF includes, for example, linear low-density polyethylenes (which are a copolymer between ethylene and an a-olefin having 4 to 12 carbon atoms), such as ethylenebutene-1 copolymer, ethylene-hexene-1 copolymer, ethylene-octene-1 copolymer, ethylene-4-methylpentene-1 copolymer and the like, a high-density polyethylene, a high-pressure-produced low-density polyethylene, a polypropylene resin, a polystyrene, and a degradable polyethylene (including a biodegradable polyethylene); however, excludes the component (B) resin and the component (A) resin used in the layer FS (i.e. layer P).

In the resin composition (comprising the component (A) and the component (B)) of the layer P, the proportions of the component (A) and the component (B) is 50 to 99% by weight (the component (A)) and 1 to 50% by weight, preferably 1 to 25% by weight, more preferably 1 to 10% by weight (the component (B), i.e. the polymer having a SP of 8.40 to 8.70).

When the proportion of the component (B) is 1 to 50% by weight, the peeling strength between the sheet portion S and the film portion F is optimum. When the proportion of the component (B) is less than 1% by weight or more than 50% by weight, the peeling strength between the two portions is too small or too large.

In the present invention, the layer Q must be a resin excluding both the component (A) used in the layer P and the component (B). When the layer Q is the resin used in the component (A) or the component (B), the layer Q and the layer P have too large an adhesion strength and it is difficult to manually peel the film portion F from the sheet portion S after the use of the container.

As necessary, the sheet portion S and the film portion F may contain additives such as antioxidant, heat stabilizer, ultraviolet absorber, lubricant, antistatic agent, mineral oil and the like.

When the sheet portion S is a plurality of layers, these layers other than the surface layer SF (which is a layer contacting with the film portion F) can include a layer made of a foamed synthetic resin having an expansion ratio of 1.1 or more such as a foamed polystyrene (e.g. a polystyrene paper (PSP) or a polystyrene low expansion sheet) and a polypropylene foamed sheet, and so on.

When the sheet portion S is a plurality of layers, each of these layers other than the surface layer SF (which is a layer contacting with the film portion F) may contain a recycled resin selected from a polystyrene, a polypropylene, a polyethylene, a polymer having a SP of 8.40 to 8.70, etc., or a mixture thereof.

The resin composition used in the layer P of the present invention can be produced by dry-blending individual components of required amounts using a mixer (e.g. a Henschel mixer or a tumbler) or sufficiently kneading the components at 160 to 260° C. using a kneader (e.g. a single- or twin-screw extruder or a Banbury mixer) and then subjecting the mixed or kneaded material to granulation. As necessary, there can be added additives such as antioxidant, heat stabilizer, ultraviolet absorber, lubricant, antistatic agent, mineral oil and the like.

The container of the present invention can be produced, for example, by first producing a film portion F using a known technique such as (1) single-layer extrusion or co-extrusion using an inflation film machine having at least one extrusion cylinder, a T-die film machine or the like or (2) lamination (e.g. dry lamination, wet lamination, sandwich lamination or hot melt lamination) using a single-layer or multi-layer film produced by the above machine, then melt-extruding, on the film portion F, the components of the individual layers of sheet portion S by extrusion lamination or co-extrusion lamination to obtain a sheet L which is a laminate of a sheet portion S and a film portion F, and lastly subjecting the sheet L to vacuum and/or pressure forming to obtain a container wherein the inside is the film portion F.

The container of the present invention preferably has, at the collar, a part having such a shape as to enable easy peeling of the film portion F. For example, a tongue can be adhered to the film portion side of the collar by heat sealing. The heat sealing can be conducted by a generally known technique of heating the tongue and the part of the container collar (to which the tongue is to be adhered) and then laminating them under pressure for several seconds. Herein, the tongue is a small film to be pinched between fingers at the time of peeling the film portion from the sheet portion. By pulling the tongue by fingers, the film portion F can be easily peeled from the sheet portion S. In stead of using the tongue, a notch may be formed in the sheet portion side of the container collar. When a notch is formed, the film portion F can be easily peeled from the sheet portion S by bending the notched part of the collar and pulling the part by fingers.

The vacuum forming, pressure forming or vacuum and pressure forming applied to the sheet L for production of the present container can be conducted by a known technique, for example, a technique of heating the sheet L, pressing the heated sheet L against a mold and simultaneously applying a vacuum, a pressure, or a vacuum and a pressure, and then cooling the formed material by, for example, air spraying of several seconds, using a vacuum forming, pressure forming or vacuum and pressure forming machine ordinarily used. The resulting material is as necessary subjected to punching with a punching edge, to remove the unnecessary parts.

The container comprising a sheet portion S and a film portion F, obtained in the present invention can be suitably used as a container for accommodating foods, etc. After the container has been used (i.e. the food in the container has been eaten up), the film portion F can be easily peeled from the sheet portion S by manually pulling the tongue or by manually bending and pulling the notch formed in the sheet portion S of the container collar; by discarding only the thin film portion F separated, the left-overs, etc. do not remain in the sheet portion S and the container (the sheet portion S) can be recovered in a clean state without being washed. Further, notwithstanding that the film portion F can be easily peeled from the sheet portion S manually, the film portion F does not peel from the sheet portion S during vacuum forming or pressure forming or vacuum and pressure forming; the forming is easy; therefore, the forming can be conducted in a short time and efficiently.

The container of the present invention is useful as a easily recyclable container and can be used very suitably, not only as a container for side dishes to be taken with rice, marketed in supermarkets, etc. but also as a container for relatively heavy goods, for example, a container for lunch box. When a food is placed in the container and is marketed as such, it is preferable to use a lid of fitting type together with the container.

The present invention is described in detail below by way of Examples. However, the present invention is in no way restricted to these Examples.

EXAMPLE 1 AND COMPARATIVE EXAMPLES 1 AND 2

(1) Production of Sheet L

A composition composed of a component (A) and a component (B) both shown in Table 1 (this composition to later become two surface layers of a sheet portion S to be produced) and a mixture of (K) and (L) both shown in Table 1 (this mixture to later become an intermediate layer of the sheet portion S) were extruded at 240° C. as a sheet portion S and laminated onto a running commercial film shown in Table 1 (this film corresponded to a film portion F), using a two-kind three-layer co-extrusion laminator (Extruders SHT-120 and SHT-75) manufactured by Hitachi Zosen Corp., whereby were produced sheets L of Example 1 and Comparative Examples 1 and 2 each constituted as shown in Table 1. The chill roll temperature was 60° C., the air gap was 300 mm, the die slit width was 1,300 mm, and the off-take speed was 16 m/min. The thicknesses of the two surface layers of the sheet portion S were each 75 μm, the thickness of the intermediate layer of the sheet portion S was 350 μm, and the thickness of the film portion F was 40 μm.

(2) Adhesivity of Sheet L

Each sheet L produced above was examined for the adhesivity between the sheet portion S and the film portion F by visual observation and manual peeling of the film portion F from the sheet portion S. The results were expressed as "O" when the film portion F adhered to the sheet portion S over the entire sheet, and as "X" when the film portion F had wrinkles or was peeled partially or not adhered at all.

(3) Vacuum Forming

Each sheet L was heated using a vacuum forming machine (CSP-10-30H and AT-1100) manufactured by Sumitomo Heavy Industries, Ltd., at 350° C. (upper heater temperature) and 225° C. (lower heater temperature), and subjected to vacuum forming using a vacuum forming mold, to produce a container. The mold temperature was 50° C.

(4) Peeling Strength of Container

In Example 1, the peeling strength was determined by the following procedure, because the peeling strength is too small.

A rectangular test piece of 15 mm in width and 100 mm in length was cut out from each container formed using a vacuum forming and measured for 180° peeling strength using a friction tester (Model TR) manufactured by Toyo Seiki Seisaku-sho, Ltd. In the measurement, a hook for load measurement was combined with the end of the film portion F of the test piece using a fish line (the fish line and the hook, and the fish line and the end of the film portion F of the test piece were fixed with a cellophane adhesive tape); the test piece was slid at a speed of 200 mm/min to give rise to 180° peeling; and the load at this time was detected.

In Comparative Example 2, the peeling strength was determined by the following procedure, because the peeling strength is comparatively large. A test piece of 15 mm in width and 100 mm in length was cut out from the container formed using a vacuum forming, and measured for 180° peeling strength using a Autograph AG 500B manufactured by Shimazu Seisaku-sho, Ltd. at a peeling speed of 200 mm/min. In Comparative Example 1, the measurement was not detected, because the film portion F does not adhere to the sheet portion S.

EXAMPLE 2

A composition comprising a component (A) and a component (B) both shown in Table 2 and (C) shown in Table 2 were extruded using a three-kind three-layer casting machine (Extruders E-65V and E-90V) manufactured by Modern Machinery Co., Ltd. to produce a two-layered film consisting of a layer made of a composition of component (A) and component (B) and a layer made of (C). The cylinder temperature was 260° C. for the composition of component (A) and component (B) and 240° C. for (C), the die temperature was 250° C., the chill roll temperature was 70° C., the off-take speed was 30 m/min, and the film width was 1,000 mm. The film thickness was 15 μm for the composition of component (A) and component (B), and was 35 μm for (C). From the thus-obtained two-layered film (D) was cut out a 40 cm×40 cm square.

Separately, there were mixed 100 parts by weight of a polystyrene [JPS G797N (trade name)] produced by Japan Polystyrene Inc., 0.6 part by weight of a foaming agent (Daiblow No. 1001 (trade name)) produced by Dainichiseika Color & Chemicals Mfg. Co., Ltd., and 1.5 parts by weight of a nucleating agent (talc); the resulting mixture was melt-kneaded at 160 to 200° C. using a T-die machine of 65 mm in diameter manufactured by Tanabe Plastics Machinery Co., Ltd.; foam extrusion from the T-die was conducted at about 170° C. to produce a foamed sheet (H) of 2.0 mm in thickness. The expansion ratio was 2.

At the time of the above foamed sheet production, the previously produced two-layered film (D) was inserted in between the T-die and the chill roll, whereby the foamed sheet (H) was laminated with the two-layered film (D) and a sheet L was obtained.

In the process, the layer comprises component (A) and component (B) of the two-layered film (D) was laminated to be contact to the foamed sheet (H).

The thus-obtained sheet L was examined for adhesivity, subjected to vacuum forming, and measured for peeling strength of formed container, in the same manners as in Example 1. The results are shown in Table 2.

TABLE 1

| | | | | Ex. 1 | Comp. Ex. 1 | Comp. Ex. 2 |
|---|---|---|---|---|---|---|
| Sheet portion S | Surface layer (wt. %) | Component (A) | A1 | 92.6 | 100.0 | 26.5 |
| | | Component (B) | B1 | 7.4 | — | 2.1 |
| | | | B2 | — | — | 66.7 |
| | | | B3 | — | — | 4.7 |
| | Intermediate layer (wt. %) | Component (C) | K | 80.0 | 80.0 | 80.0 |
| | | | L | 20.0 | 20.0 | 20.0 |
| | | | H | — | — | — |
| Film portion F | | | | N | N | N |
| Adhesivity of sheet L | | | | O | x | O |
| Peeling strength of container (g/15 mm width) | | | | 16.5 | — | 2750 |

TABLE 2

| | | | | Ex. 2 |
|---|---|---|---|---|
| Sheet portion S | Surface layer (SF) (wt. %) | Component (A) | A1 | 92.6 |
| | | Component (B) | B1 | 7.4 |
| | Not (SF) surface layer (wt. %) | Component (C) | H | 100.0 |
| Film portion F | | | | E |
| Adhesivity of sheet L | | | | O |
| Peeling strength of container (g/15 mm width) | | | | 3.0 |

The components shown in Tables 1 and 2 are as follows.

Sheet Portion S

Component (A):
  A1: A polystyrene resin (JPS H640 (trade name), a HIPS produced by Japan Polystyrene Inc.) having a melt flow rate (MFR) of 2.8 g/10 min as measured at 200° C. and a load of 5 kgf., a density of 1.05 g/cm3 and an average gel particle diameter of 2.2 μm.

Components (B):
  The solubility parameter (SP) of each component was calculated using the previously-shown formula and indicated in Table 3.
  B1: An ethylene-methyl methacrylate copolymer (Acryft CM5019 (trade name) produced by Sumitomo Chemical Co., Ltd.) having a methyl methacrylate content of 30% by weight and an MFR of 20 g/10 min as measured at 190° C. and a load of 2.16 kgf.

B2: A polypropylene [Sumitomo Noblen AD571 (trade name) produced by Sumitomo Chemical Co., Ltd.] having an MFR of 0.2 g/10 min as measured at 230° C. and a load of 2.16 kgf.

B3: A hydrogenation product of a styrene-isoprene block copolymer (Septon 2104 (trade name) produced by Kuraray Co., Ltd.) having a styrene content of 65% and an isoprene content of 35%.

Component (C):

K: A polystyrene resin (JPS G590 (trade name), a GPPS produced by Japan Polystyrene Inc.) having an MFR of 3.0 g/10 min as measured at 200° C. and a load of 5 kgf.

L: A polystyrene resin (JPS H640 (trade name), a HIPS produced by Japan Polystyrene Inc.) having an MFR of 2.8 g/10 min as measured at 200° C. and a load of 5 kgf., a density of 1.05 g/cm$^3$ and an average gel particle diameter of 2.2 $\mu$m.

H: The polystyrene foamed sheet produced in Example 2.

Film Portion F

N: A polypropylene/polyethylene/polypropylene three-layered film (S012 (trade name) produced by SUN-TOX CO., LTD.) having a thickness of 40 $\mu$m.

E: A polypropylene (Sumitomo Noblen AD571 (trade name) produced by Sumitomo Chemical Co., Ltd.) having an MFR of 0.2 g/10 min as measured at 230° C. and a load of 2.16 kgf.

TABLE 3

|  | B1 | B2 | B3 |
|---|---|---|---|
| Density ($\rho$) (g/cm$^3$) | 0.94 | 0.90 | 0.96 |
| Molecular weight/M of repeating unit | 35.7 | 42.0 | 60.0 |
| $\Sigma$Fi | 321 | 375 | 529 |
| SP | 8.45 | 8.04 | 8.46 |

The followings are clear from the above results. In Examples 1 and 2 satisfying all the requirements of the present invention, the peeling strength of sheet L between film portion F and sheet portion S can be set at 2 to 45 g/15 mm (width) by appropriately selecting the raw materials of individual layers and appropriately combining the layers; in the container obtained by vacuum forming of sheet L, the film portion F is sufficiently adhered to the sheet portion S but can be peeled from the sheet portion S more easily than in conventional containers.

Meanwhile, in Comparative Example 1 wherein the surface layer SF of the sheet portion S, contacting with the film portion F is a layer P but contains no component (B), the film portion F does not adhere to the sheet portion S. Also in Comparative Example 2 wherein the surface layer SF of the sheet portion S, contacting with the film portion F is a layer P, the surface layer FS of the film portion F, contacting with the sheet portion S is a layer Q, and the polypropylene used in the layer FS is used also in the layer SF, the adhesion strength between sheet portion S and film portion F is too large and manual peeling of the film portion F from the sheet portion S is difficult.

Thus, in the container satisfying the requirements of the present invention, the thin surface film can be easily peeled by manual pulling of the tongue, after the use of the container; therefore, the left-overs in the container can be discarded in a state wrapped by the film; and the container can be easily recovered without being washed.

What is claimed is:

1. A recyclable container obtained by subjecting a synthetic resin sheet L to vacuum forming and/or pressure forming, which container has an inner surface and an outer surface, the sheet L being a laminate of a plurality of layers wherein two adjacent layers are selected so as to provide a minimum peeling strength and can be manually separated into two portions at the interface of the two adjacent layers, said sheet L having a film portion F present from the interface of said two adjacent layers to the inner surface of the container and a portion S from said interface to the outer surface of the container, wherein the film portion F is a single-layered film or a multi-layered film comprising two or more layers and the sheet portion S is a single-layered sheet or a multi-layered sheet comprising two or more layers, wherein none of said adjacent layers giving the minimum peeling strength, belonging to the film portion F is named as layer FS and the other layer belonging to the sheet portion S is named as layer SF and is an unfoamed synthetic resin, either of the layer FS and the layer SF comprises a resin composition containing the following component (A) in an amount of 50 to 99 % by weight and the following component (B) in an amount of 1 to 50% by weight (this layer is named as layer P) and the other layer comprises, as a resin, the component (A) other than used in the layer P and comprises no component (B) (this layer is named as layer Q), wherein the peeling strength required for peeling of the film portion F from the sheet portion S is set at 2 to 45 g/15 mm (width), wherein (A) one kind of resin selected from polystyrene, polypropylene and polyethylene, and wherein (B) at least one kind of polymer other than the component (A), having a solubility parameter (SP) of 8.40 to 8.70 and selected from the group consisting of ethylene and at least one vinyl monomer selected from the group consisting of unsaturated carboxylic acids, unsaturated carboxylic acid esters and vinyl acetate.

2. A container according to claim 1, wherein the container has a collar which has a part that facilitates the peeling of the film portion F.

3. A container according to claim 2, wherein the collar part is a tongue or a notched part formed in the collar so that the notched part can be bent and pulled manually.

4. A container according to claim 1, wherein the proportions of the component (A) and the component (B) in the resin composition containing these two components are 75 to 99% by weight (the component (A)) and 1 to 25% by weight (the component (B)).

5. A container according to claim 2, wherein the proportions of the component (A) and the component (B) in the resin composition containing these two components are 75 to 99% by weight (the component (A)) and 1 to 25% by weight (the component (B)).

6. A container according to claim 3, wherein the proportions of the component (A) and the component (B) in the resin composition containing these two components are 75 to 99% by weight (the component (A)) and 1 to 25% by weight (the component (B)).

7. A container according to claim 1, wherein the resin constituting the layer Q is a polyethylene and the component (A) in the layer P is a polystyrene.

8. A container according to claim 1, wherein the resin constituting the layer Q is a polypropylene and the component (A) in the layer P is a polyethylene or a polystyrene.

9. A container according to claim 1, wherein the resin constituting the layer Q is a polystyrene and the component (A) in the layer P is a polypropylene or a polyethylene.

10. A container according to claim 1, wherein the resin constituting the layer Q is a polyethylene and the component (A) in the layer P is a polystyrene.

11. A container according to claim 1, wherein, when the sheet portion S is a multi-layered sheet, at least one layer of the sheet portion S other than the layer SF contacting with the film portion F is made of a foamed synthetic resin.

12. A container according to claim 1, wherein, when the sheet portion S is a multi-layered sheet, at least one layer of the sheet portion S other than the layer SF contacting with the film portion F contains at least one kind of recycled resin selected from polystyrene, polyethylene, polypropylene, and polymers having a solubility parameter (SP) of 8.40 to 8.70.

13. A container according to claim 1, wherein the peeling strength needed for peeling of the film portion F from the sheet portion S is 2 to 25 g/15 mm (width).

14. A container according to claim 1, wherein the sheet portion S and the film portion F have been laminated by melt-extruding a sheet portion S onto a running film portion F.

15. A container according to claim 1, which is used for foods.

* * * * *

UNITED STATES PATENT AND TRADEMARK OFFICE
CERTIFICATE OF CORRECTION

PATENT NO.    : 6,391,402 B1
DATED         : May 21, 2002
INVENTOR(S)   : Kenzi Yokota et al.

It is certified that error appears in the above-identified patent and that said Letters Patent is hereby corrected as shown below:

<u>Column 12,</u>
Line 19, change "none" to -- one --.

Signed and Sealed this

Twenty-fifth Day of February, 2003

JAMES E. ROGAN
*Director of the United States Patent and Trademark Office*